April 2, 1957  B. PASCHEN  2,787,082
RAT TRAP
Filed Sept. 2, 1954
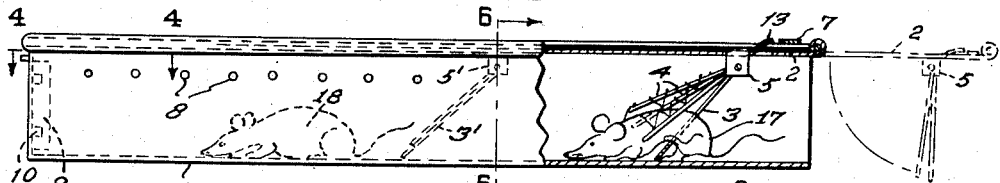
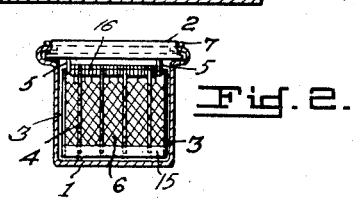
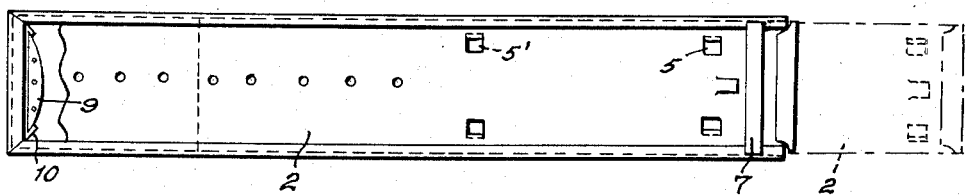
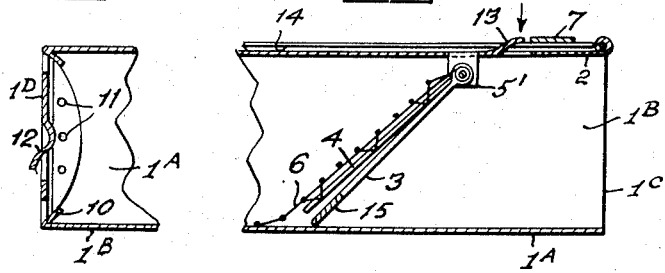
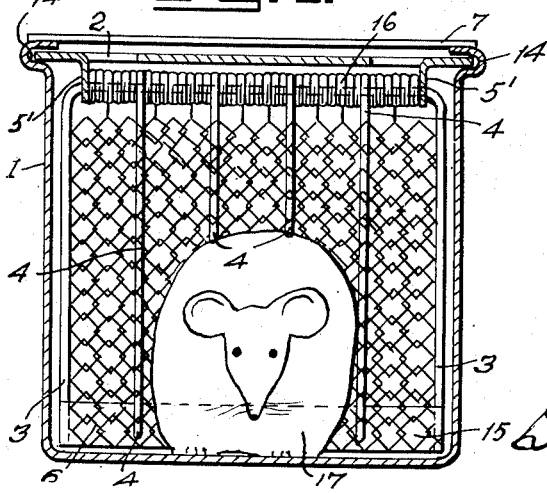
INVENTOR.
Baldomero Paschen
BY
Attorneys.

United States Patent Office 2,787,082
Patented Apr. 2, 1957

2,787,082
RAT TRAP

Baldomero Paschen, Penco, Chile

Application September 2, 1954, Serial No. 453,760

5 Claims. (Cl. 43—66)

The present invention relates to an improved rodent trap.

The invention has for an object to provide such a trap that is simple in construction and very efficient in operation.

A further object of the invention is to provide a rodent trap which includes a one-way gate associated with an open-ended container and which gate is adapted to be pushed aside by an entering rodent and then fall back in place to prevent egress of the rodent.

As a specific object the gate includes a flexible wire mesh curtain of trapezoidal shape suspended within the container with the widest end down and associated with a frame including independently movable stiffening rods for the curtain which would permit the entrance of a rodent into the container by pushing against the curtain to raise the lower end thereof.

Further and more specific objects will be apparent from the following description taken in connection with the accompanying drawings, in which:

Figure 1 illustrates in side elevation an improved rodent trap in accordance with the invention and with a portion of the figure cut away for clarity, Figure 2 is an end elevational view through the open end of the container with the walls thereof shown in section, Figure 3 is a plan view of the trap shown in Figure 1 with a portion broken away to show the bait holder, Figure 4 is an enlarged fragmentary cross section on line 4—4 of Figure 1, Figure 5 is an enlarged fragmentary longitudinal sectional view taken through the trap at its entrance end, and Figure 6 is an enlarged cross sectional view taken on line 6—6 of Figure 1 and further illustrating how the gate conforms to the contour of a rodent passing therethrough.

As is clear from the drawings, the improved rodent trap includes a box or container 1 formed from any suitable material such as metal, wood or plastic and which includes a bottom wall 1A, opposite side walls 1B, open end 1C, and a closed end 1D. The opposite side walls have longitudinal grooves 14 formed therein and a cover 2 is slidably mounted within the grooves. One or more transverse stiffening bars 7 are secured to the top of the side walls to stiffen the container. To releasably lock the slide cover 2 in position a spring lock 13 is pressed up from the top of the cover for cooperation with the bridge 7 adjacent the open end of the container. By pressing this spring lock down in the direction of the arrow P and at the same time withdrawing the cover the spring lock 13 passes under the stiffener 7 and the cover can be withdrawn. When the cover is inserted and pushed into the container the spring lock passes under the bridge or stiffener 7 and then snaps up to the position shown in Figures 1 and 5 so as to hold the cover in position.

Operatively associated with the cover and disposed within the container are one or more one-way gate means which control the entrance into and egress from the interior of the box or container. Depending from the cover are a pair of hinge ears 5. A wire frame 3 which is U-shaped is hinge mounted at the bight thereof in the hinge ears 5. The legs of the U-shaped frame are disposed adjacent the side walls of the container. Secured to the bight portion of the frame and the legs thereof is a flexible, closely woven chain type wire mesh curtain 6 that hangs loosely with respect to the bottom end of the legs of the frame 3. A bar 15 is secured across and interconnects the bottom ends of the U-shaped frame 3. The mesh curtain 6 before it is mounted on the frame is of trapezoidal shape and is secured to the frame with its wider end at the bottom. When the curtain is placed on the frame it is stiffened by a plurality of wire rods 4 having sharp points at their lower ends and having their upper ends coiled loosely around the bight portion of the frame 3 so that the wire rods are independently pivotally mounted on the frame. The coil portions 16 form spacers to space the wire rods 4 relative to one another and further to ensure that they only swing about the axis of the bight portion of the frame in parallel vertical planes extending longitudinally of the box. The rods 4 pass through some of the openings in the meshed curtain so as to stiffen the same. The length of the legs of the frame 3 and the wire rods 4 is such that they extend at an acute angle relative to the bottom of the container with the lower end of the frame normally resting on the bottom and the lower ends of the rods 4 contacting the connecting bar 15. The area of contact of the bottom of the frame with the bottom of the container is closer to the closed end of the container than are the hinge ears 5 whereby the only possible upward swinging movement is between the bottom of the container and the top in the direction toward the closed end. The object of the loose chain link mesh curtain 6 is to provide a curtain that will adapt itself to rats or rodents of any size that enter the container and pass beneath the curtain with the wire mesh following the contour of the entering rodent to prevent egress of any previously trapped rodent that otherwise could take advantage of any space formed by the entrance of additional rodents into the trap and thus escape. To attract the rodents a bait box 9 is furnished with suitable bait and then removably associated with the closed end 1D of the container by spring clamps 10 and a spring lock 12 which are pressed out of the closed end. Apertures 11 are provided in the bait box to permit the odor of the bait to attract the rodents. A one-way gate 3', which is similar to the gate previously described, is placed within the container at a distance from the first mentioned gate and is pivotally supported by the ears 5'. The container may be as long as desired and ventilating holes 8 are formed in the sides and the cover.

In Figure 6 is shown the approximate shape assumed by the wire mesh curtain 6 when a rodent passes beneath the same. A freely suspended bottom and large portion of the curtain adapts itself to the shape of the rat or rodent entering the trap.

In the use of the trap and assuming a suitable bait has been placed in the bait box and the slide cover 2 is in closed position, a rat or other rodent attracted by the odor of the bait enters the open end of the container that is the right hand end of Figures 1, 3 and 5. The rodent will push against the mesh curtain 6 which will yield to his passage and step over the transverse bar 15 in its effort to reach the bait. In Figure 1 the numeral 17 diagrammatically represents a rodent starting his passage beneath the gate and the wire mesh curtain 6 and the rods 4 are raised as shown. In Fig. 6, it will be noted that the curtain closely follows the body contour of the entering rodent, and, it is not possible for a previously caught rodent to move past the curtain toward the open end of the container and thus escape. The frame, that is the side legs 3 and transverse bar 15, remain resting on the bottom of the container 1. Once the rodent has passed the curtain 6 the same falls down against the transverse bar 15 and prevents egress of the rodent. The latter is forced to go forward and passes the second and similar one-way curtain gate 3' as shown at 18 and is thus imprisoned within the container. Since the length of the container from the innermost curtain 6 can be as long as necessary a plurality of rodents can be imprisoned within the space between the innermost curtain and the bait box. Once the trap is full of rodents they may be destroyed by suspending the container from its left end, Figures 1 and 3, in water to drown the rodents. The trap is suspended in water only to such an extent as will prevent the water from coming in contact with the bait box so as not to spoil the bait. Therefore bait will last a long time and does not have to be replaced if the rodents are killed.

To empty the container of rodents that have been killed the slide cover 2 is pulled to the right as shown in dotted lines in Figures 1 and 3 and the container is inverted. In the event the container is used at sea it is only necessary to open the cover 2 and throw the rodents overboard.

What I claim is:

1. A rodent trap comprising a container having opposite sides, a bottom and an open top, one closed and one open end, means removably closing the top, a bait box within the container and operatively associated with the closed end, at least one one-way gate means mounted within the container and including a flexible mesh curtain of trapezoidal outline, means suspending the curtain within the container with its widest end disposed at the bottom of the container and having at least a portion of its bottom end free whereby a rodent can push its way beneath said curtain while moving the same in the direction toward the closed end with the curtain conforming to the contour of the rodent as the latter passes beneath the same and means preventing the curtain being moved toward the open end so as to trap the rodent.

2. A rodent trap as claimed in claim 1 in which said gate means includes prongs independently pivotally suspended within the container at an angle toward the bottom of the container and engaging at least a portion of the curtain so as to support the same and aid in preventing egress of rodents.

3. A rodent trap comprising an elongated container including a bottom, opposite side walls and one end wall, each side wall having a slide-way therein, a cover slidably mounted within the slide-ways for removably closing the container, releasable locking means for securing the cover in closed position, a bait box removably associated with the closed end of the container, at least one pair of hinge ears depending from the cover, and at least one one-way gate means within the container including a U-shaped rod pivoted in the hinge ears, said U-shaped rod including a bight portion and legs and with the legs thereof suspended adjacent the side walls, a flexible wire mesh curtain suspended from the bight and legs of the rod, a bar secured across and interconnecting the lower ends of the legs, and a plurality of spaced rods independently pivotally mounted about the bight portion of the U-shaped rod and passed through at least some of the openings in the curtain, said curtain having a wider bottom than top whereby it and the rods can be displaced relative to the U-shaped rod, the legs of the U-shaped rod and the said plurality of rods having an axial extent greater than the distance from the hinge ears to the bottom whereby the interconnected legs of the rod normally rest on the bottom at a position closer the closed end than the hinge ears so that when a rodent enters the open end it can advance past the curtain by pushing toward the closed end with the independently pivoted rods and the larger bottom portion of the curtain raising up to permit passage of the rodent and thereafter falling into contact with the said bar to prevent egress of the rodent.

4. A rodent trap as claimed in claim 3 in which a pair of spaced one-way gate means are suspended from the cover with one of the gate means being adjacent the open end of the container.

5. A rodent trap as claimed in claim 4 in which the pair of gate means are movable in the direction of the closed end of the container.

References Cited in the file of this patent

UNITED STATES PATENTS

| | | |
|---|---|---|
| 936,836 | Voter | Oct. 12, 1909 |
| 1,010,256 | Harris | Nov. 28, 1911 |
| 1,151,041 | Reefe | Aug. 24, 1915 |
| 1,246,112 | Kinsley | Nov. 13, 1917 |
| 1,759,048 | Fisher | May 20, 1930 |